US012756553B2

(12) United States Patent
Meaney et al.

(10) Patent No.: US 12,756,553 B2
(45) Date of Patent: Oct. 6, 2026

(54) DYNAMIC KEY REASSIGNMENT FOR MEMORY ENCRYPTION KEYS

(71) Applicant: INTERNATIONAL BUSINESS MACHINES CORPORATION, Armonk, NY (US)

(72) Inventors: Patrick James Meaney, Poughkeepsie, NY (US); Glenn David Gilda, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 18/893,152

(22) Filed: Sep. 23, 2024

(65) Prior Publication Data

US 2026/0088995 A1 Mar. 26, 2026

(51) Int. Cl.
*H04L 9/08* (2006.01)
*G06F 11/10* (2006.01)
*G06F 21/60* (2013.01)

(52) U.S. Cl.
CPC .......... *H04L 9/0891* (2013.01); *G06F 11/106* (2013.01); *G06F 21/602* (2013.01)

(58) Field of Classification Search
USPC .......................................................... 713/190
See application file for complete search history.

(56) References Cited

U.S. PATENT DOCUMENTS

| | | | |
|---|---|---|---|
| 7,151,832 B1 | 12/2006 | Fetkovich et al. | |
| 8,625,789 B2 | 1/2014 | McGowan | |
| 9,459,997 B2 | 10/2016 | Curley et al. | |
| 10,027,640 B2 | 7/2018 | Avanzi et al. | |
| 10,116,442 B2 | 10/2018 | Mori et al. | |
| 10,372,926 B1 | 8/2019 | Leshinsky et al. | |
| 10,581,812 B2 | 3/2020 | Rohloff et al. | |
| 11,018,858 B2 | 5/2021 | Karame | |
| 11,626,985 B1 | 4/2023 | Copparapu et al. | |
| 2007/0067644 A1 | 3/2007 | Flynn et al. | |
| 2011/0047440 A1* | 2/2011 | Blackmon | G06F 11/141 714/764 |
| 2015/0143200 A1* | 5/2015 | Chinnakkonda Vidyapoornachary | G06F 11/2015 714/770 |
| 2015/0318058 A1* | 11/2015 | Curley | G06F 12/0253 714/41 |
| 2017/0308313 A1* | 10/2017 | Chinnakkonda Vidyapoornachary | G06F 3/0619 |
| 2022/0284087 A1* | 9/2022 | Hunt | H04L 9/0894 |
| 2024/0118970 A1* | 4/2024 | Sandoval Torres | G06F 11/106 |
| 2025/0245354 A1* | 7/2025 | Lee | G06F 21/602 |

(Continued)

FOREIGN PATENT DOCUMENTS

| | | | |
|---|---|---|---|
| CN | 112463805 B * | 11/2023 | G06F 16/23 |

*Primary Examiner* — Sakinah White-Taylor
(74) *Attorney, Agent, or Firm* — Onyx IP Group

(57) ABSTRACT

Dynamic key reassignment for memory encryption keys, including: performing a key reassignment for a memory area by, for each memory address of a plurality of memory addresses in the memory area: reading data from a selected memory address by decrypting the data using a first encryption key stored in a first encryption key register, wherein the selected memory address is stored in a scrub address register incremented after each iteration of the key reassignment; and writing the data to the selected memory address by encrypting the data using a second encryption key stored in a second encryption key register.

20 Claims, 8 Drawing Sheets

(56) References Cited

U.S. PATENT DOCUMENTS

| | | | | |
|---|---|---|---|---|
| 2025/0245388 | A1* | 7/2025 | Na | G06F 21/602 |
| 2026/0064858 | A1* | 3/2026 | Aga | G06F 21/602 |

* cited by examiner

DYNAMIC KEY REASSIGNMENT FOR MEMORY ENCRYPTION KEYS

BACKGROUND

The present disclosure relates to methods, apparatus, and products for dynamic key reassignment for memory encryption keys.

SUMMARY

According to embodiments of the present disclosure, various methods, apparatus and products for dynamic key reassignment for memory encryption keys are described herein. In some aspects, dynamic key reassignment for memory encryption keys includes performing a key reassignment for a memory area by, for each memory address of a plurality of memory addresses in the memory area: reading data from a selected memory address by decrypting the data using a first encryption key stored in a first encryption key register, wherein the selected memory address is stored in a scrub address register incremented after each iteration of the key reassignment; and writing the data to the selected memory address by encrypting the data using a second encryption key stored in a second encryption key register. In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

DETAILED DESCRIPTION

Memory encryption is used to encrypt data stored in system memory in order to prevent unauthorized access to that data. Existing solutions for memory encryption set a memory encryption key and, where used, a nonce, when the system is initialized that will remain unchanged during system operation. Changing this memory encryption key and nonce would require that the system be restarted. Accordingly, should the memory encryption key and nonce be compromised while the system is in operation, data stored in memory may be potentially exposed.

Figure 1:
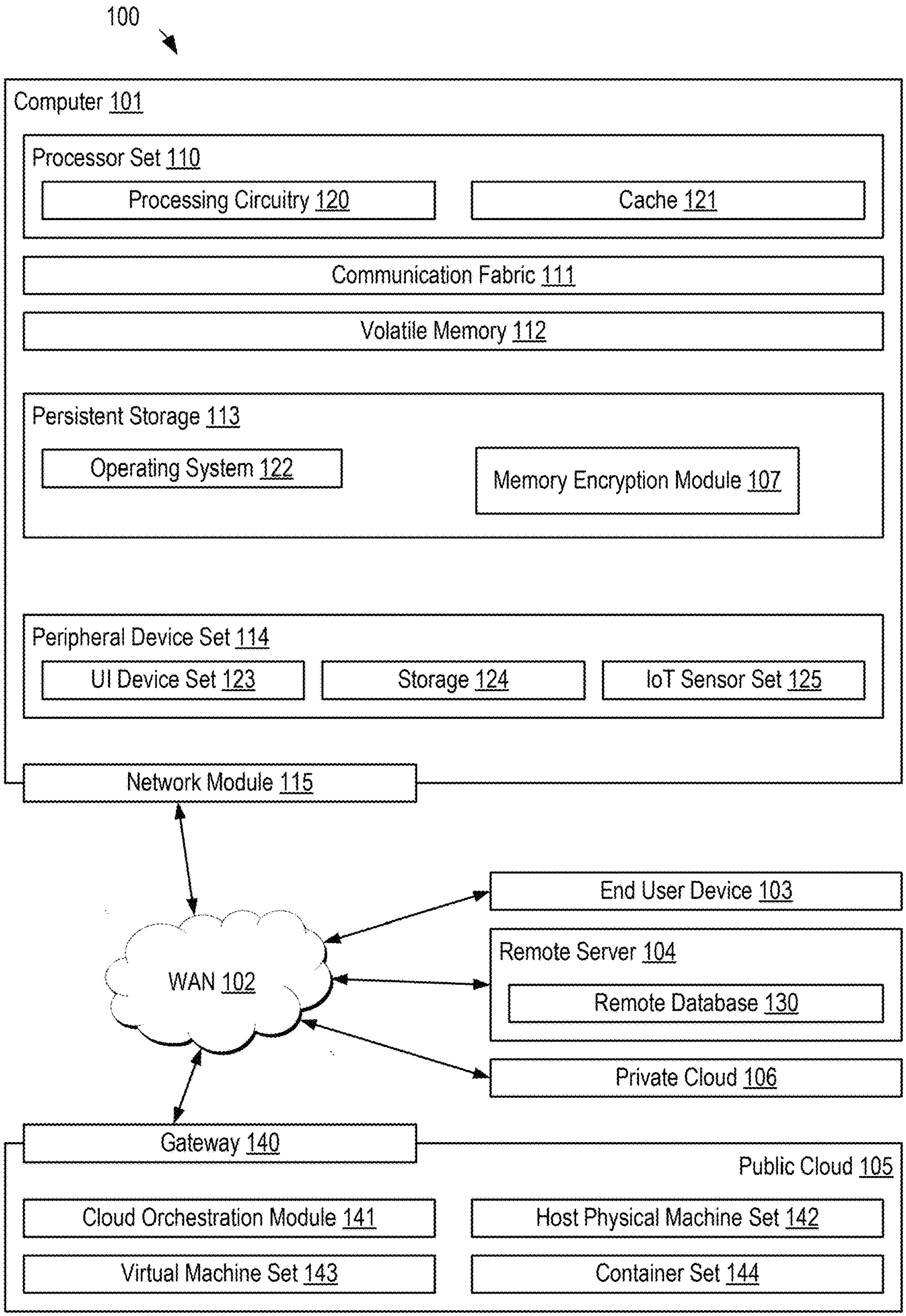
FIG. 1 sets forth a block diagram of an example computing environment for dynamic key reassignment for memory encryption keys in accordance with some embodiments of the present disclosure.

With reference now to FIG. 1, shown is an example computing environment according to aspects of the present disclosure. Computing environment 100 contains an example of an environment for the execution of at least some of the computer code involved in performing the various methods described herein, such as the memory encryption module 107. In addition to memory encryption module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
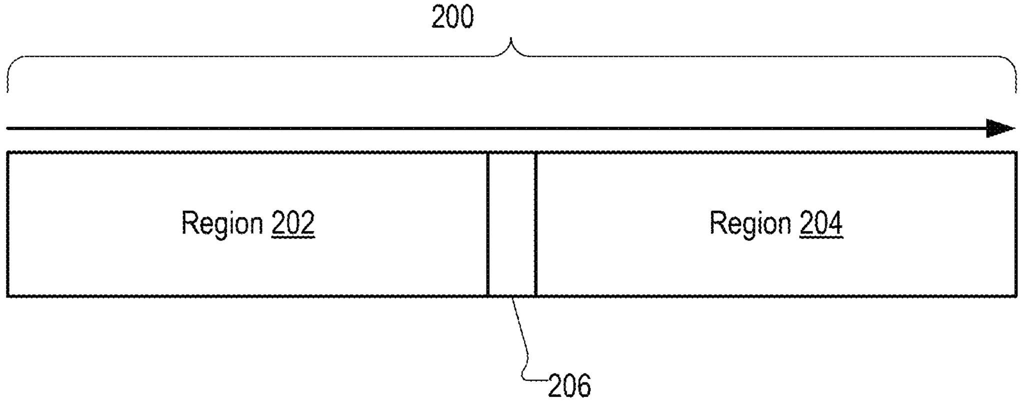
FIG. 2 sets forth a diagram of a memory area for dynamic key reassignment for memory encryption keys in accordance with some embodiments of the present disclosure.

FIG. 2 sets forth a diagram of an example memory area 200 for dynamic key reassignment for memory encryption keys in accordance with some embodiments of the present disclosure. The example of memory area 200 is some portion of memory, such as a rank or other portion of memory, for which the encryption key and/or nonce used to encrypt that area of memory will be changed (e.g., for which a key reassignment will be performed). Particularly, the memory area 200 may correspond to volatile or non-persistent memory such as RAM. Here, the example memory area 200 is depicted as having a key reassignment in progress. Region 202 is a subset of the memory area 200 (e.g., a subset of addresses) encrypted using a new encryption key and/or nonce. Region 204 a is a subset of the memory area 200 encrypted using a prior encryption key and/or nonce to be reassigned. Address 206 is an address of the memory area 200 undergoing key reassignment. As an example, in some embodiments, the address 206 may correspond to an address stored in a scrub address register. This scrub address register may be initialized to a first address in the memory area 200 and incremented as key reassignment is performed for each address in the memory area 200. In other words, the scrub address register stores a pointer to an address 206 that delineates, within a memory area 200, a region 202 for which key reassignment has been performed and a region 204 for which key reassignment has yet to be performed.

In the example memory area 200, the addresses of the region 204 are greater than the region 202. Accordingly, key reassignment may be performed by starting from the lowest address in the memory area 200, corresponding to the lowest address of the region 202. Data from that address may be loaded and decrypted using the prior encryption key and/or nonce. That data may then be encrypted using the new encryption key and/or nonce and stored back into that address, thereby completing key reassignment for that address. The particular address undergoing key reassignment, shown as address 206, may then be incremented. This process repeats until all addresses of the memory area 200 have undergone key reassignment (e.g., their data loaded and decrypted using the prior encryption key and/or nonce, and then encrypted and stored using the new encryption key and/or nonce).

As will be described in further detail below, in some embodiments, key reassignment for an area of memory may be performed as part of some other maintenance operation such as a memory scrub. In a memory scrub, data is read from an address of memory and, if any errors are detected, the data is corrected and rewritten using error correction codes for that data. Accordingly, in some embodiments, when a memory area 200 is to be scrubbed, key reassignment may also be performed on that memory area 200. For example, data may be loaded from an address of the memory area and decrypted using the prior encryption key and/or nonce. This may be used to leverage the atomicity of memory scrubs whereby an address being scrubbed is locked and cannot be read from or written to until the memory scrub, and by extension the key reassignment, is complete. Any necessary error corrections may be performed and the data encrypted and rewritten using the new encryption key and/or nonce. In some embodiments, key reassignment may be performed for a memory area 200 independent of any other maintenance process.

Figure 3:
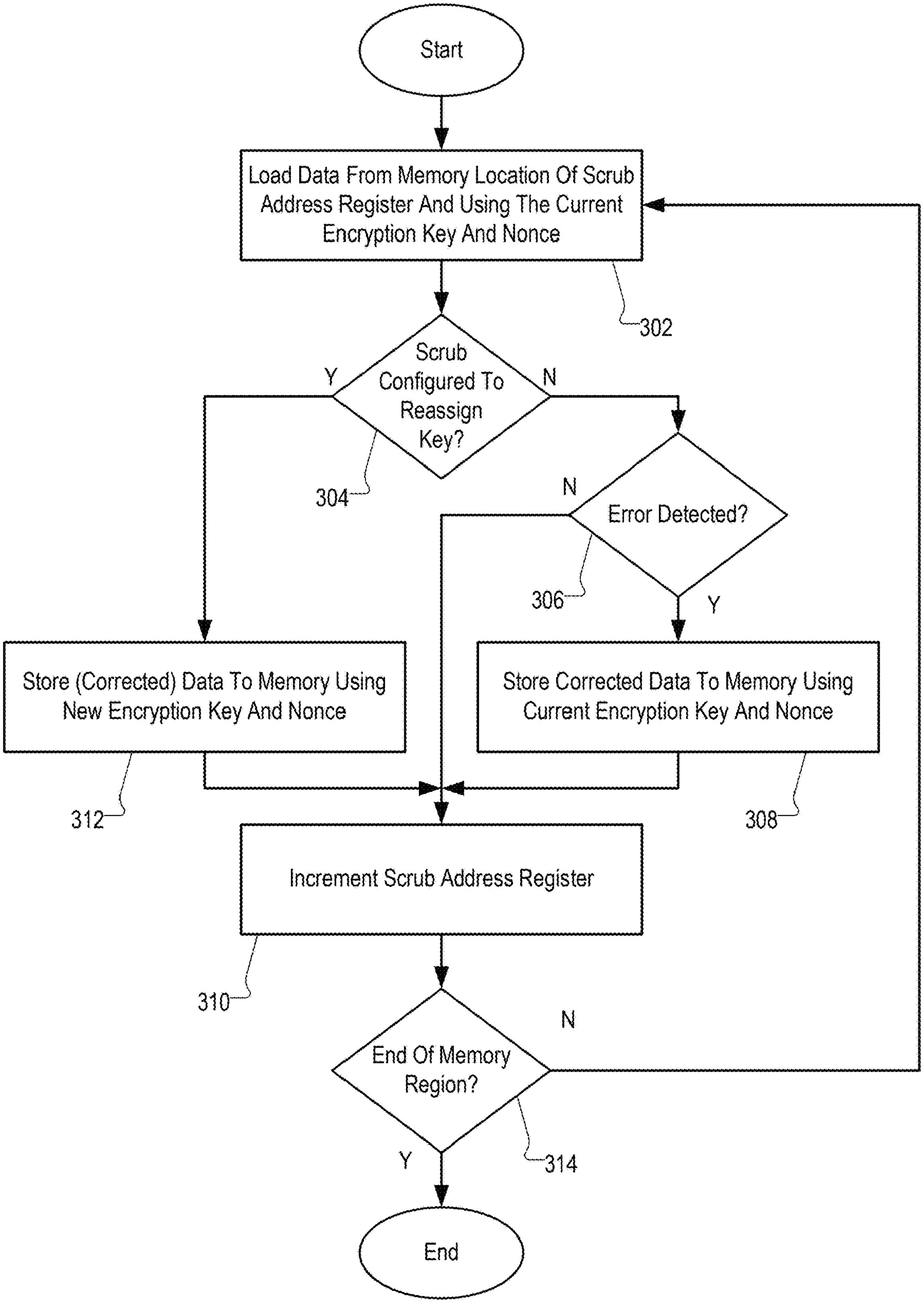
FIG. 3 sets forth a flowchart for dynamic key reassignment for memory encryption keys in accordance with some embodiments of the present disclosure.

FIG. 3 shows a flowchart for dynamic key reassignment for memory encryption keys in accordance with some embodiments of the present disclosure. Particularly, the flowchart of FIG. 3 depicts a memory scrub operation which may be configured to perform key reassignment. The method of FIG. 3. may be performed, for example, by a memory controller unit (MCU). Beginning with block 302, data is loaded from a memory location of a scrub address register using a current encryption key and nonce to decrypt the data from memory. The current encryption key and/or nonce may be stored in a particular register or combination of registers. The scrub address register is a register storing the address of memory to be scrubbed. As will be described in further detail below, the address in the scrub address register will be incremented at each iteration in order to scrub, and potentially perform key reassignment, for each address in the area of memory. The current encryption key and nonce are the encryption key and nonce used to encrypt the data at the address stored in the scrub address register if key reassignment is not being performed.

At block 304 it is determined whether the current memory scrub operation is configured to reassign the key for the scrubbed memory. If not, meaning that the memory should only be scrubbed for error correction, the process advances to block 306. If, at block 306, an error is detected, the process may advance to block 308 where corrected data is stored using the current encryption key and nonce to encrypt the data, after which the process advances to block 310 where the scrub address register is incremented. If, at block 306, no error is detected, the process then advances to block 310 to increment the scrub address register.

Turning back to block 304, where the scrub operation is also configured to perform key reassignment, the process advances to block 312. At block 312, the previously loaded data is stored back into the address of the scrub address register encrypted using the new encryption key and nonce to encrypt the data. The new encryption key and nonce may each be stored in a particular register or combination of registers. If any errors were detected in this data, the corrected data will be encrypted using the new encryption key and nonce for storage. The process then advances to block 310 where the scrub address register is incremented. At block 314, if the end of the memory region to be scrubbed has been reached (e.g., the address in the scrub address register is outside of the memory region), the process ends. Otherwise, the process returns to block 302 where data is loaded from the incremented scrub address register using the current encryption key and nonce.

Figure 4:
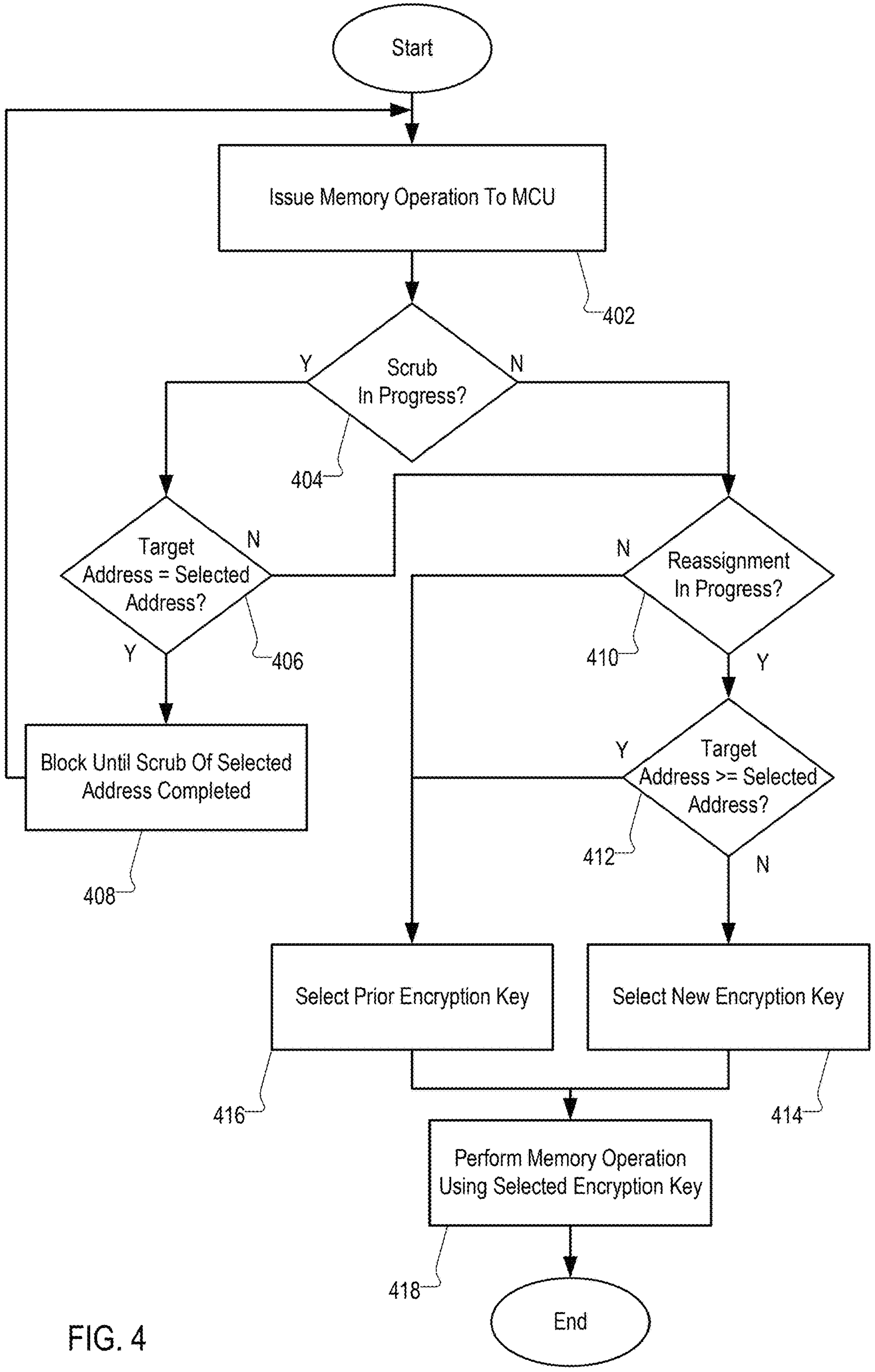
FIG. 4 sets forth a flowchart for dynamic key reassignment for memory encryption keys in accordance with some embodiments of the present disclosure.

FIG. 4 shows another flowchart for dynamic key reassignment for memory encryption keys in accordance with some embodiments of the present disclosure. Particularly, FIG. 4 depicts how memory operations may be issued during a memory scrub and/or key reassignment of a memory area. The method of FIG. 4. may be performed, for example, by a memory controller unit (MCU). Beginning with block 402, a memory operation is issued to the MCU. Such a memory operation may include a read operation or a write operation directed to a target address. At block 404, if a scrub operation is in progress, the process advances to block 406 where the target address of the memory operation is compared to a selected address of the scrub operation. The selected address of the scrub operation is the memory address currently being scrubbed (e.g., having its data loaded for error correction). Readers will appreciate that the atomicity of the scrub operation prevents memory operations from being issued to the selected address until the scrub has been completed. Accordingly, if at block 406, the target address is equal to the selected address, the process moves to block 408 where the memory operation is blocked until the scrub of the selected address is completed.

If, at block 404, no scrub operation is in progress or, if at block 406, a scrub operation is in progress but the target address is not equal to the selected address, the process advances to block 410 where it is determined if a key reassignment is in progress. If no key assignment is in progress the process advances to block 416 where the prior encryption key is selected. Here, the prior encryption key is the key used to either decrypt (for a read operation) or encrypt (for a write operation) the data at the target address.

If, at block 410, a key reassignment is in progress, the process advances to block 412 where the target address is compared to the selected address. As a key reassignment is in progress, some addresses in the memory area will be encrypted using the prior encryption key while some other addresses will be encrypted using the new encryption key. Accordingly, where the target address is greater than or equal to the selected address (e.g., where the target address is included in a region of the memory area for which key reassignment has yet to be performed), the process advances to 416 where the prior encryption key is selected. Where the target address is less than the selected address, meaning that the target address is in a region for which key reassignment has been performed, the new encryption key (e.g., the reassigned key) is selected at block 414. At block 418 the memory operation is performed using the selected key, after which the process ends.

Figure 5:
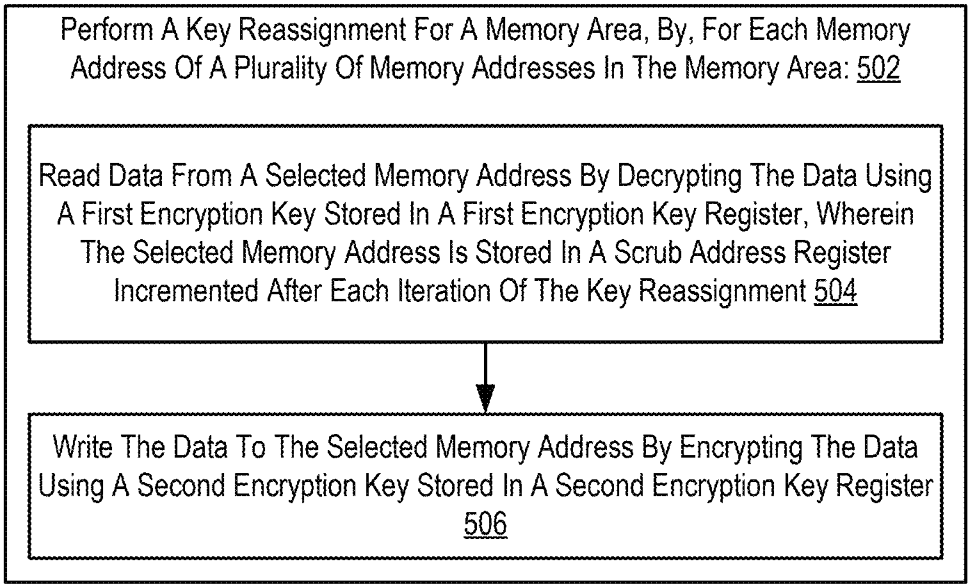
FIG. 5 sets forth a flowchart of an example method for dynamic key reassignment for memory encryption keys in accordance with some embodiments of the present disclosure.

For further explanation, FIG. 5 sets forth a flowchart of an example method of dynamic key reassignment for memory encryption keys in accordance with some embodiments of the present disclosure. In some embodiments, the method of FIG. 5 may be performed by a memory controller unit (MCU) operatively coupled to one or more memory modules including an encrypted memory area for which key reassignment will be performed. In some embodiments, the method of FIG. 5 may be performed, for example, using the memory encryption module 107 of FIG. 1.

The method of FIG. 5 includes performing 502 a key reassignment for a memory area by, for each memory address of a plurality of memory addresses in the memory area: reading 504 data from a selected memory address by decrypting the data using a first encryption key stored in a first encryption key register, wherein the selected memory address is stored in a scrub address register incremented after each iteration of the key reassignment; and writing 506 the data to the selected memory address by encrypting the data using a second encryption key stored in a second encryption key register.

The first encryption key is an encryption key used to encrypt data in the memory area prior to the key reassignment. The second encryption key is another encryption key used to encrypt data in the memory area after the key reassignment has been completed. In some embodiments, data may be encrypted in the memory area (e.g., using the first encryption key before key reassignment or the second encryption key after key reassignment) using a nonce. In some embodiments, the first encryption key may be used (e.g., to encrypt or decrypt data) in combination with a first nonce while the second encryption key may be used in combination with a second nonce different from the first nonce. Accordingly, in some embodiments, performing the key reassignment on the memory area causes data stored using a first encryption key and nonce combination to instead be stored using a second encryption key and nonce combination.

For example, in some embodiments, the selected memory address in the scrub address register may be initialized as a first address in the memory area. After reading 504 data from that selected address using the first encryption key and/or nonce and writing 506 data encrypted using the second encryption key and/or nonce to the selected memory address, the selected memory address in the scrub address register may be incremented. This process may then be repeated until each address in the memory address has had its stored data re-encrypted using the second encryption key and/or nonce.

After performing 502 the key reassignment on the area of memory, memory operations directed to the area of memory will use the second encryption key. In other words, data may be read from or written to the area of memory by decrypting or encrypting the data, respectively, using the second encryption key. The area of memory will continue to use the second encryption key during system operation unless another key reassignment is performed.

In some embodiments, the approaches set forth above may be performed across multiple memory channels. For example, in some embodiments, the memory area may correspond to a particular memory channel of a plurality of memory channels. Each memory channel may correspond to different memory modules with each memory module encrypting data using a different encryption key. Accordingly, key reassignment may be performed for each of these memory channels independently or in combination with each other.

Readers will appreciate that the approaches set forth herein allow for the encryption key and/or nonce used to encrypt an area of memory to be dynamically changed during system operation rather than requiring the system to be reinitialized. Thus, the time at which data may be exposed due to compromised encryption keys and/or nonces is reduced, improving overall system security and system uptime.

Figure 6:
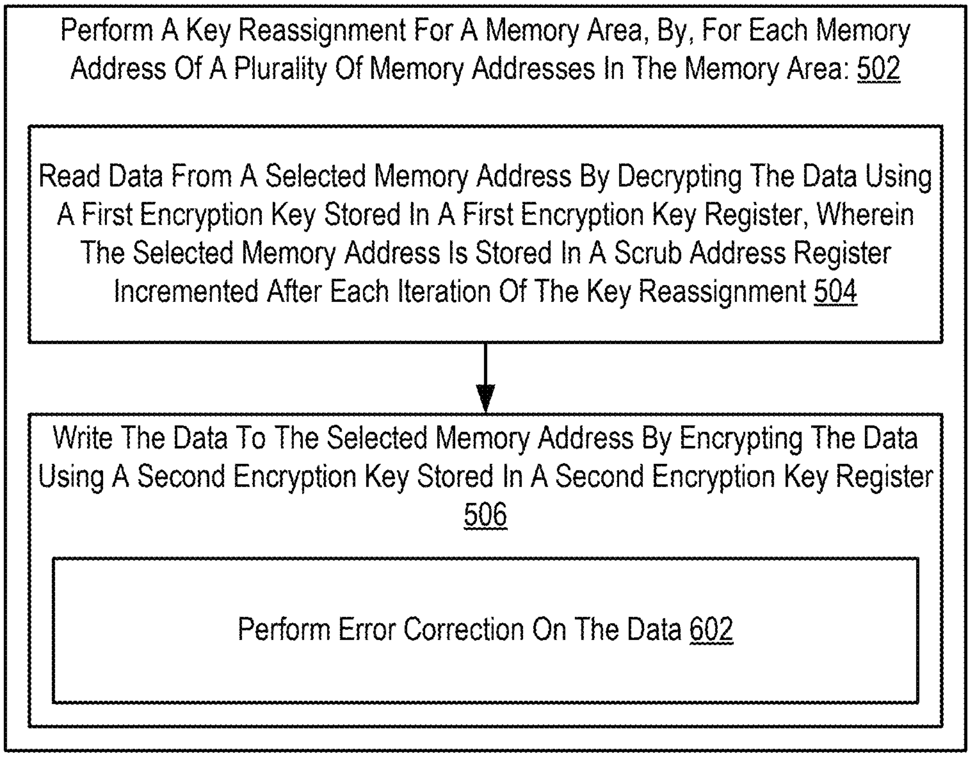
FIG. 6 sets forth a flowchart of another example method for dynamic key reassignment for memory encryption keys in accordance with some embodiments of the present disclosure.

For further explanation, FIG. 6 sets forth a flowchart of another example method of dynamic key reassignment for memory encryption keys in accordance with some embodiments of the present disclosure. The method of FIG. 6 is similar to FIG. 5 in that the method of FIG. 6 also includes: performing 502 a key reassignment for a memory area by, for each memory address of a plurality of memory addresses in the memory area: reading 504 data from a selected memory address by decrypting the data using a first encryption key stored in a first encryption key register, wherein the selected memory address is stored in a scrub address register incremented after each iteration of the key reassignment; and writing 506 the data to the selected memory address by encrypting the data using a second encryption key stored in a second encryption key register.

The method of FIG. 6 differs from FIG. 5 in that writing 506 the data to the selected memory address by encrypting the data using a second encryption key stored in a second encryption key register also includes performing 602 error correction on the data (e.g., the data read 504 from the selected memory address). In some embodiments, performing 502 the key reassignment may include performing the key reassignment as part of or concurrent to a scrub operation. During a scrub operation for an area of memory, data is iteratively loaded from addresses in the area of memory. Where an error is detected in that data, the errors may be corrected using error correction codes and the corrected data is rewritten to memory.

Accordingly, where the key reassignment is performed 502 as part of a scrub operation, error correction may be performed 602 on the loaded data before being rewritten using the second encryption key. In some embodiments, performing 602 error correction on the data may include identifying any errors in the data and, if present, correcting the identified errors. Thus, the data written 506 to the selected memory address using the second encryption key may include the loaded data if no errors are identified or the corrected data if any errors were identified.

Figure 7:
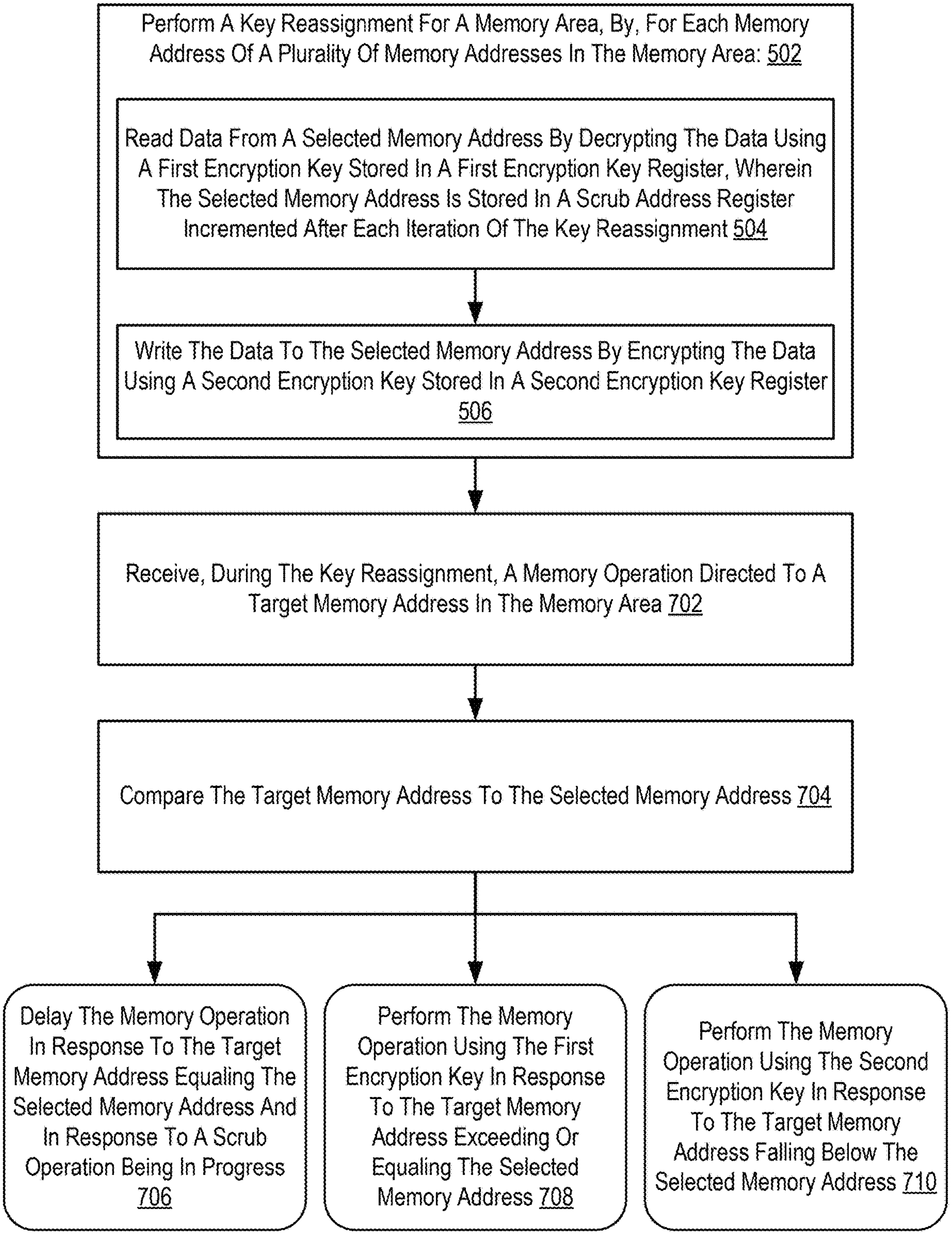
FIG. 7 sets forth a flowchart of another example method for dynamic key reassignment for memory encryption keys in accordance with some embodiments of the present disclosure.

For further explanation, FIG. 7 sets forth a flowchart of another example method of dynamic key reassignment for memory encryption keys in accordance with some embodiments of the present disclosure. The method of FIG. 7 is similar to FIG. 5 in that the method of FIG. 7 also includes: performing 502 a key reassignment for a memory area by, for each memory address of a plurality of memory addresses in the memory area: reading 504 data from a selected memory address by decrypting the data using a first encryption key stored in a first encryption key register, wherein the selected memory address is stored in a scrub address register incremented after each iteration of the key reassignment; and writing 506 the data to the selected memory address by encrypting the data using a second encryption key stored in a second encryption key register.

The method of FIG. 7 differs from FIG. 5 in that the method of FIG. 7 also includes receiving 702, during the key reassignment, a memory operation directed to a target memory address in the memory area. The memory operation may include read operation or a write operation. As the memory operation is received 702 during the key assignment, the memory area includes, at the time at which the memory operation was received 702, a region of memory for which key reassignment has been completed (e.g., that uses the second encryption key) and a region of memory for which key reassignment has yet to be completed (e.g., that uses the first encryption key).

The method of FIG. 7 also includes comparing 704 the target memory address to the selected memory address. If the target address is equal to the selected memory address and a scrub operation is in progress (e.g., if the key reassignment is part of a scrub operation on the memory area) the memory operation should be blocked until scrubbing and key reassignment of the selected memory address is completed. The indication that the scrub operation is in progress may be active until the next address for scrubbing is selected. Accordingly, in some embodiments, the method of FIG. 7 may also include delaying 706 the memory operation in response to the target memory address equaling the selected memory address and in response to a scrub operation being in progress.

If the target address is greater than the selected memory address, meaning that the target address is included in a region of the memory area for which key reassignment has not yet been performed, the first encryption key should be used to perform the memory operation (e.g., to encrypt data written by a write operation or to decrypt data loaded by a read operation). Accordingly, in some embodiments, the method of FIG. 7 also includes performing 708 the memory operation using the first encryption key in response to the target memory address exceeding or equaling (with no scrub operation in progress) the selected memory address.

If the target address is less than the selected memory address, meaning that the target address is included in a region of the memory area for which key reassignment has been performed, the second encryption key should be used to perform the memory operation. Accordingly, in some embodiments, the method of FIG. 7 also includes performing 710 the memory operation using the second encryption key in response to the target memory address falling below the selected memory address.

Figure 8:
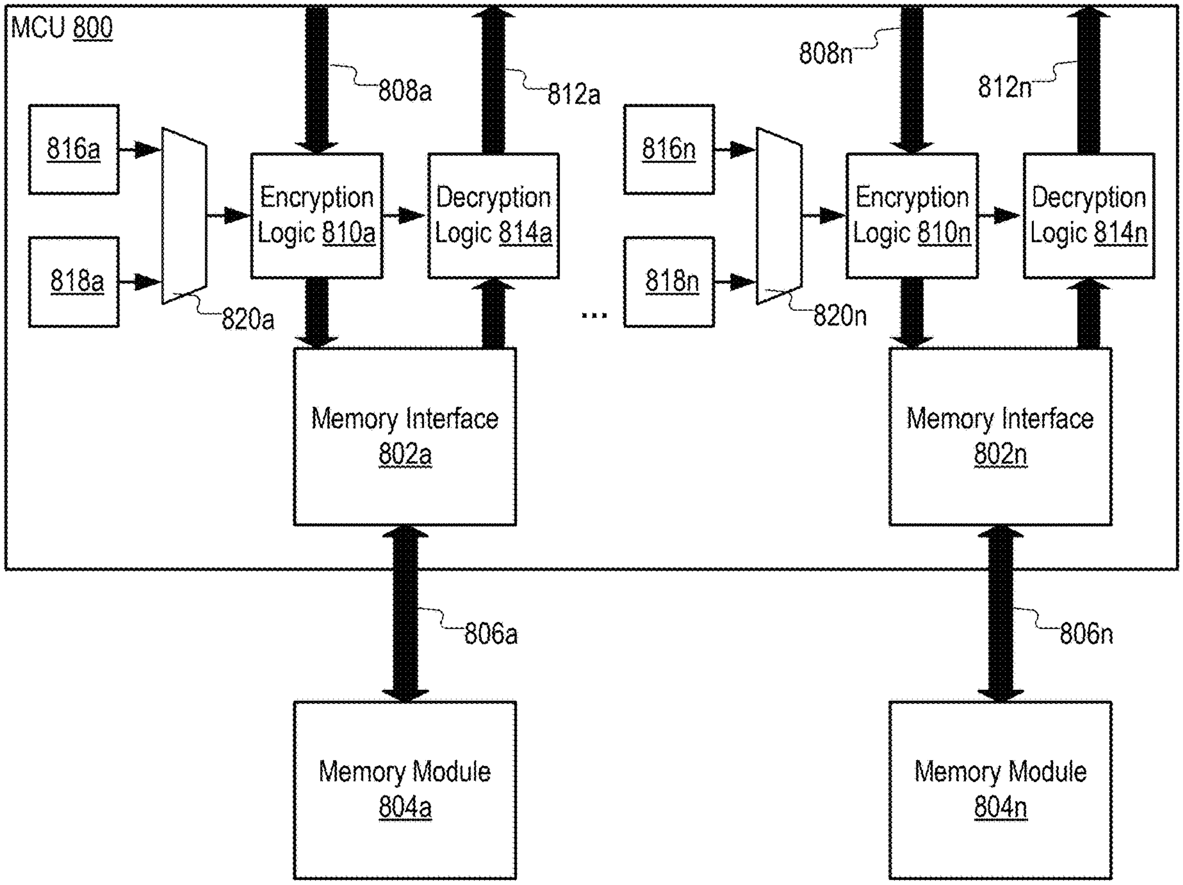
FIG. 8 sets forth a block diagram of a memory controller unit for dynamic key reassignment for memory encryption keys in accordance with some embodiments of the present disclosure.

In some embodiments, the approaches set forth herein for dynamic key reassignment for memory encryption keys may be performed by an MCU. Accordingly, FIG. 8 sets forth a block diagram of an example MCU 800 in accordance with some embodiments of the present disclosure. Readers will appreciate that the example MCU 800 if FIG. 8 is merely illustrative and that other configurations are also contemplated within the scope of the present disclosure. The example MCU 800 includes multiple memory interfaces 802*a-n* operatively coupling the MCU 800 to a corresponding memory module 804*a-n* using a data channel 806*a-n*. Each memory module 804*a-n* may include, for example, a dual inline memory module (DIMM) or another memory module 804*a-n* as can be appreciated.

An unencrypted data store channel 808*a-n* provides unencrypted data from outside the MCU 800 for storage into a memory module 804*a* after being encrypted using encryption logic 810*a-n*. An unencrypted data fetch channel 812*a-n* provides unencrypted data from the MCU 800 read from a memory module 804*a-n* after being decrypted using decryption logic 814*a-n*. Moreover, the encryption logic 810*a-n* and decryption logic 814*a-n* may be used to perform key reassignment as described above for their respective memory modules 804*a-n*. As shown, each memory module 804*a-n* may have corresponding pairs of current encryption keys 816*a-n* and new encryption keys 818*a-n*. In some embodiments, these keys may be loaded from a pool of keys protected by firmware, hardware, and the like. In some embodiments, the current encryption keys 816*a-n* and new encryption keys 818*a-n* may be provided to their corresponding encryption logic 810*a-n* and/or decryption logic 814*a-n* using multiplexors 820*a-n*.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
performing a key reassignment for a memory area by, for each memory address of a plurality of memory addresses in the memory area:
reading data from a selected memory address by decrypting the data using a first encryption key stored in a first encryption key register, wherein the selected memory address is stored in a scrub address register incremented after each iteration of the key reassignment; and
writing the data to the selected memory address by encrypting the data using a second encryption key stored in a second encryption key register.

2. The computer-implemented method of claim 1, wherein the data is decrypted using a first nonce and wherein the data is encrypted using a second nonce.

3. The computer-implemented method of claim 1, further comprising:
receiving, during the key reassignment, a memory operation directed to a target memory address in the memory area; and
comparing the target memory address to the selected memory address.

4. The computer-implemented method of claim 3, further comprising blocking the memory operation in response to the target memory address equaling the selected memory address and in response to a scrub operation in progress.

5. The computer-implemented method of claim 3, further comprising performing the memory operation using the first encryption key in response to the target memory address exceeding or equaling the selected memory address.

6. The computer-implemented method of claim 3, further comprising performing the memory operation using the second encryption key in response to the target memory address falling below the selected memory address.

7. The computer-implemented method of claim 1, wherein writing the data to the selected memory address further comprises performing error correction on the data.

8. The computer-implemented method of claim 1, wherein the memory area corresponds to a particular memory channel of a plurality of memory channels each corresponding to a different encryption key.

9. An apparatus comprising:
a memory; and
a memory controller unit operatively coupled to the memory, the memory controller unit configured to:

perform a key reassignment for a memory area, wherein, for each memory address of a plurality of memory addresses in the memory area, the memory controller unit is configured to:

read data from a selected memory address by decrypting the data using a first encryption key stored in a first encryption key register, wherein the selected memory address is stored in a scrub address register incremented after each iteration of the key reassignment; and write the data to the selected memory address by encrypting the data using a second encryption key stored in a second encryption key register.

10. The apparatus of claim 9, wherein the data is decrypted using a first nonce and wherein the data is encrypted using a second nonce.

11. The apparatus of claim 9, wherein the memory controller unit is further configured to:

receive, during the key reassignment, a memory operation directed to a target memory address in the memory area; and compare the target memory address to the selected memory address.

12. The apparatus of claim 11, wherein the memory controller unit is further configured to delay the memory operation in response to the target memory address equaling the selected memory address and in response to a scrub operation in progress.

13. The apparatus of claim 11, wherein the memory controller unit is further configured to perform the memory operation using the first encryption key in response to the target memory address exceeding or equaling the selected memory address.

14. The apparatus of claim 11, wherein the memory controller unit is further configured to perform the memory operation using the second encryption key in response to the target memory address falling below the selected memory address.

15. The apparatus of claim 9, wherein, to write the data to the selected memory address, the memory controller unit is further configured to perform error correction on the data.

16. The apparatus of claim 9, wherein the memory area corresponds to a particular memory channel of a plurality of memory channels each corresponding to a different encryption key.

17. A computer program product comprising:

one or more computer-readable storage media; and program instructions stored on the one or more storage media to perform operations comprising:

performing a key reassignment for a memory area by, for each memory address of a plurality of memory addresses in the memory area:

reading data from a selected memory address by decrypting the data using a first encryption key stored in a first encryption key register, wherein the selected memory address is stored in a scrub address register incremented after each iteration of the key reassignment; and writing the data to the selected memory address by encrypting the data using a second encryption key stored in a second encryption key register.

18. The computer program product of claim 17, wherein the data is decrypted using a first nonce and wherein the data is encrypted using a second nonce.

19. The computer program product of claim 17, wherein the operations further comprise:

receiving, during the key reassignment, a memory operation directed to a target memory address in the memory area; and comparing the target memory address to the selected memory address.

20. The computer program product of claim 19, wherein the operations further comprise blocking the memory operation in response to the target memory address equaling the selected memory address and in response to a scrub operation in progress.

* * * * *